(12) United States Patent
Aumann et al.

(10) Patent No.: US 11,932,177 B2
(45) Date of Patent: Mar. 19, 2024

(54) CLADDING PART

(71) Applicant: Bayerische Motoren Werke Aktiengesellschaft, Munich (DE)

(72) Inventors: Thomas Aumann, Buch am Erlbach (DE); Florian Dechant, Adlkofen (DE); Johann Gasslhuber, Buch am Erlbach (DE); Dienhung Huynh, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/112,697

(22) Filed: Feb. 22, 2023

(65) Prior Publication Data

US 2023/0264638 A1    Aug. 24, 2023

(30) Foreign Application Priority Data

Feb. 23, 2022    (DE) .................. 10 2022 104 235.9

(51) Int. Cl.
| | |
|---|---|
| *B60R 13/02* | (2006.01) |
| *B32B 3/26* | (2006.01) |
| *B32B 5/02* | (2006.01) |
| *B60Q 3/14* | (2017.01) |
| *B32B 5/26* | (2006.01) |
| *B32B 7/12* | (2006.01) |

(52) U.S. Cl.
CPC .......... *B60R 13/0256* (2013.01); *B32B 3/266* (2013.01); *B32B 5/026* (2013.01); *B60Q 3/14* (2017.02); *B32B 5/022* (2013.01); *B32B 5/279* (2021.05); *B32B 7/12* (2013.01); *B32B 2262/0253* (2013.01); *B32B 2262/0269* (2013.01); *B32B 2307/41* (2013.01); *B32B 2307/414* (2013.01); *B32B 2605/003* (2013.01); *B60R 2013/0281* (2013.01); *B60R 2013/0287* (2013.01)

(58) Field of Classification Search
CPC ............ B60Q 3/54; B32B 2262/12–16; B32B 3/26–30; B60R 13/02–0268
See application file for complete search history.

(56) References Cited

U.S. PATENT DOCUMENTS

| | | |
|---|---|---|
| 6,397,638 B1 | 6/2002 | Roell |
| 2016/0229338 A1 | 8/2016 | Sato |

(Continued)

FOREIGN PATENT DOCUMENTS

| | | |
|---|---|---|
| DE | 198 47 331 A1 | 4/2000 |
| DE | 20 2009 001 216 U1 | 4/2009 |
| DE | 10 2011 114 974 A1 | 4/2013 |

(Continued)

OTHER PUBLICATIONS

German-language Search Report issued in German Application No. 10 2022 104 235.9 dated Nov. 9, 2022 with partial English translation (11 pages).

(Continued)

*Primary Examiner* — Mariceli Santiago
(74) *Attorney, Agent, or Firm* — Crowell & Moring LLP

(57) ABSTRACT

A cladding part has a carrier part and a surface covering, which is arranged on a side of the carrier part that faces the surface covering. The surface covering is made of an intrinsically stiff knitted-fabric material.

4 Claims, 1 Drawing Sheet

(56) References Cited

U.S. PATENT DOCUMENTS

2017/0291536 A1* 10/2017 Cannon .................. B60Q 3/54
2021/0252828 A1   8/2021 Eitel et al.

FOREIGN PATENT DOCUMENTS

| DE | 10 2015 013 669 A1 | 4/2017 |
| DE | 10 2020 122 441 A1 | 3/2021 |
| DE | 10 2020 123 661 A1 | 3/2021 |
| DE | 10 2020 104 078 A1 | 8/2021 |

OTHER PUBLICATIONS

German-language Search Report issued in German Application No. 10 2022 104 234.0 dated Nov. 11, 2022 with partial English translation (11 pages).

* cited by examiner

CLADDING PART

CROSS REFERENCE TO RELATED APPLICATION

This application claims priority under 35 U.S.C. § 119 from German Patent Application No. DE 102022104235.9, filed Feb. 23, 2022, the entire disclosure of which is expressly incorporated by reference herein.

This application contains subject matter related to U.S. application Ser. No. 18/112,691, entitled "Trim Part," filed on Feb. 22, 2023.

BACKGROUND AND SUMMARY

The present invention relates to a cladding part having a carrier part and a surface covering.

In contemporary vehicle construction, surfaces in the vehicle interior or in the passenger compartment of motor vehicles are provided with decorative elements in order to create an appealing visual impression for the occupants of the vehicle. For the interior trim parts, or cladding parts, there is a multiplicity of surface variants (leather, artificial leather, films, textiles) that are applied to a carrier by various laminating methods. At present, for laminated interior trim parts, e.g. a knitted spacer fabric, a foam backing or nonwoven fabric is used as a haptic layer. In this context, it has become customary to adhesively bond decorative elements, for example in the form of films with the visual appearance of wood or carbon, to a plastic carrier. In addition, it is also known to mount skins of leather or artificial leather on carrier structures using laminating methods, e.g. press laminating methods or similar laminating methods, e.g. without a fixed upper tool, in order to create the visual appearance of leather. In the course of this laminating operation, the films or the skins are materially bonded to the underlying carrier structure using an adhesive. The heat needed to activate the adhesive is introduced into the adhesive joint through the skin via a hot press die of the press laminating tool by way of contact heat or by means of IR radiation. This activates the adhesive during the laminating method and connects the film or the skin to the carrier structure.

Many of these surfaces, however, have restrictions in terms of the possible uses of the cladding parts in the vehicle interior owing to the materials used and owing to the production method used.

US 2016/0229338 A1 discloses the provision and backlighting of cladding parts with a knitted surface.

Taking this prior art as a starting point, the object of the present invention is to provide a cladding part which overcomes the disadvantages of the prior art. It is in particular an object of the invention to specify a cladding part which is distinguished by a surface that appears to be of particularly high quality.

This object is achieved by a cladding part according to the features of the independent claim. Further embodiments are specified in the dependent patent claims.

To achieve this and other objects, the invention proposes a cladding part having a carrier part and a surface covering. The surface covering is arranged on a first side of the carrier part and is made of an intrinsically stiff knitted-fabric material. The intrinsic stiffness of the surface covering offers the advantage that the surface covering does not deform in regions in which it is not supported by the carrier part, even under the action of gravitational force. This offers the advantage that any edges of the carrier part are not reproduced on a visible surface of the cladding part. In other words, the knitted-fabric material offers sufficient intrinsic stability, or stiffness, which allows cutouts or apertures in the underlying carrier part to be spanned without impressions being reproduced on the surface of the surface covering.

Furthermore, the surface covering may have two layers, comprising a first layer of knitted-fabric material, which forms a visible surface of the surface covering in the cladding part, and an underlying intrinsically stiff layer, which is not visible in the cladding part. This offers the advantage that an intrinsically stiff layer can be provided on a back side of the surface covering, or of the visible decorative layer, the intrinsically stiff layer forming the back side. This intrinsically stiff layer may be made of a polymer mesh, for example. As an alternative, it is also possible to use other plastic-based materials for the intrinsically stiff portion of the covering, in particular nonwovens (e.g. needlefelt webs, random fibers or water-jet webs), polypropylene mesh, natural fiber polypropylene, knitted spacer fabrics etc.

The intrinsically stiff layer may have a translucent design. This offers the advantage that light striking the intrinsically stiff layer can pass through the layer. Consequently, light effects can be realized on the visible surface of the cladding part. The intrinsically stiff layer may have diffuse light transmission.

At least one light source may be provided on a side of the carrier part that faces away from the surface covering. This makes it possible for light emitted by the light sources to pass through the carrier part and be conducted into the knitted fabric and thus through the knitted fabric via the intrinsically stiff layer.

In an alternative embodiment, the material of the carrier part may be opaque and translucent apertures may be provided in the carrier part. These apertures may optionally be filled with ambient air or closed by a translucent solid body. This embodiment offers the advantage that discrete regions that are light-transmissive can be provided locally, with shading of the light source being created in the rest of the regions, in which the carrier material is opaque.

According to one variant of the cladding part, the surface covering may be materially bonded to the carrier part. In this case, the surface covering may be adhesively bonded to the carrier part.

The cladding part is preferably an interior component for the vehicle interior of a vehicle, such as instrument panels, door claddings, arm rests, central consoles, closable storage compartments such as glove boxes, etc. Glove boxes may be cladded both on the outside and inside. Therefore, 2D/3D knitted fabrics can be used as interior surfaces for creation of a component.

However, the cladding part may also be used for other means of transport, such as aircraft, ships, trains etc. The use of the cladding part in furniture or furnishings is also contemplated.

A knitted material, or knitted fabric, should be understood to mean a sheet-like textile in the context of the invention. The knitted fabric is preferably formed from a front-side knitted fabric and a back-side knitted fabric, the front-side knitted fabric and the back-side knitted fabric preferably each being produced from a yarn or monofilament. The yarn according to the invention is, in turn, formed from a multiplicity of filaments. For example, a yarn comprises 50 to 100, in particular 70, filaments. The filaments are preferably manufactured from a plastic and/or aramid and/or a similar material. A 3D knitted fabric is manufactured in a three-dimensional manner by way of its special production process and consequently differs from a two-dimensional, flat knitted fabric both in terms of handling and manufacturing and the requirements for fastening and processing. A 3D knitted fabric is generally manufactured for the covering over a carrier component and advantageously enables processing with reduced offcuts or even without offcuts.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
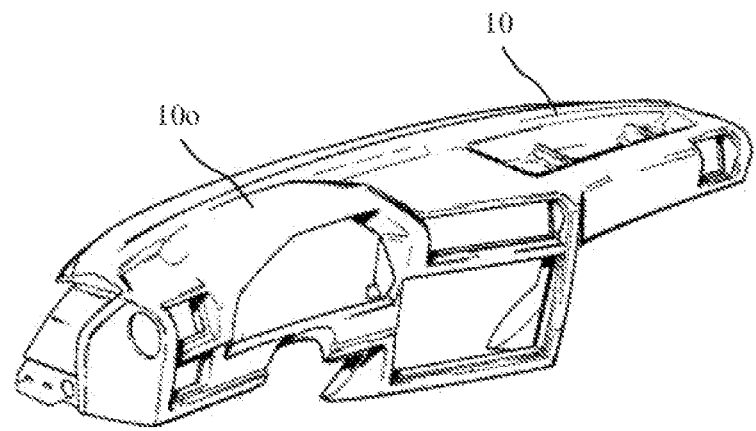
FIG. 1 is a perspective view of an exemplary carrier part.

FIG. 1 shows, by way of example, an instrument panel carrier 10, which is to serve as a carrier part 10 for the purpose of explaining the method. As an alternative to the instrument panel carrier illustrated, all of the cladding parts located in the interior, such as glove boxes, central arm rests, central consoles, panels, armrests in the door claddings, door claddings, roof liners, rear consoles, pillar claddings, etc. may also serve as carrier structure 10. This instrument panel carrier 10 has a surface 10o, which is to be covered by means of a surface covering 20. As is illustrated in FIG. 1, this surface 10o may concern merely a portion, such as for example the upper surface of the binnacle of what is known as the instrument cluster. The surface 10o to be covered may, however, also be that part of the surface of the carrier part 10 that would be visible to an occupant of the vehicle in the interior space of the vehicle. As a further alternative, the surface 10o may also comprise the entire surface of the carrier part 10, although in that case regions of the carrier part 10 that are not visible to an occupant of the vehicle would also be laminated.

Figure 2:
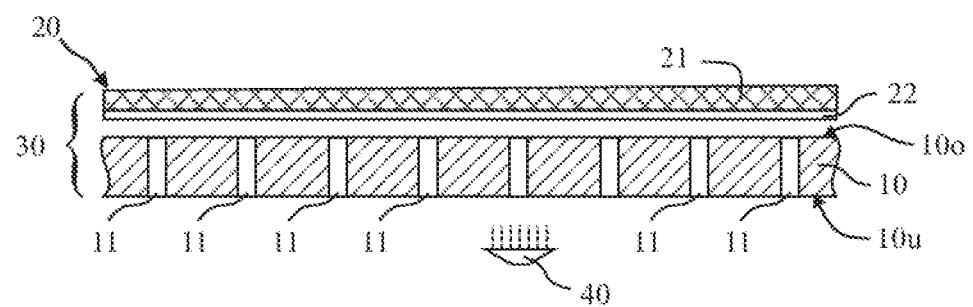
FIG. 2 is an exemplary sectional view through a cladding part before the surface covering is applied.

FIG. 2 depicts a cladding part 30, specifically in a partially exploded illustration. Here, the surface covering 20 has not yet been applied to the carrier part 10. The surface covering 20 has a two-layer structure and comprises a first layer 21, which forms a decorative layer visible to an occupant of the vehicle. A second layer 22, which is in touching contact with the first layer 21, is provided underneath the first layer in the figure. The second layer 22 thus forms a back material which has sufficient stiffness and intrinsic stability features. The first layer 21 may, for example, be materially bonded, in particular adhesively bonded, to the second layer 22.

The carrier part 10 has a surface 10o facing the surface covering 20. The surface covering is laminated onto this surface. In the process, for example, a material bond can be created by means of applying glue between the second layer 22 of the surface covering 20 and the surface 10o of the carrier part 10. By way of example, FIG. 2 depicts a light source 40 on an opposite side of the carrier part 10 to the surface covering 20. The light source emits light, which can shine through the otherwise opaque material of the carrier part 10 as a result of apertures 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cladding part, comprising:
   a carrier part; and
   a surface covering arranged on a side of the carrier part that faces the surface covering, wherein
   the surface covering is made of a knitted-fabric material, wherein the knitted-fabric material is formed from a front-side knitted fabric and a back-side knitted fabric, wherein the front-side knitted fabric and the back-side knitted fabric are each produced from a yarn, wherein the yarn is formed from a multiplicity of filaments that comprise 50 to 100 filaments, wherein the filaments are manufactured from a plastic and/or an aramid material, and wherein the knitted-fabric material is intrinsically stiff such that the surface covering does not deform in regions in which the surface covering is not supported by the carrier part, and thus no edges of the carrier part are reproduced on a visible surface of the cladding part, even under an action of gravitational force.

2. The cladding part according to claim 1, further comprising:
   at least one light source provided on a side of the carrier part that faces away from the surface covering.

3. The cladding part according to claim 1, wherein the carrier part comprises an opaque material, and translucent apertures are provided in the carrier part.

4. The cladding part according to claim 1, wherein the surface covering is materially bonded to the carrier part.

* * * * *